United States Patent [19]

Lang

[11] 4,395,965
[45] Aug. 2, 1983

[54] LOW DRAG UNDERWATER VEHICLE UTILIZING BOUNDARY LAYER SUCTION

[75] Inventor: Thomas G. Lang, Solana Beach, Calif.

[73] Assignee: The United States of America as represented by the Secretary of the Navy, Washington, D.C.

[21] Appl. No.: 219,463

[22] Filed: Dec. 23, 1980

[51] Int. Cl.³ .............................................. F42B 19/00
[52] U.S. Cl. .................... 114/20 R; 114/67 A
[58] Field of Search ............. 114/20 R, 20 A, 67 R, 114/67 A; 244/130, 73 R

[56] References Cited

U.S. PATENT DOCUMENTS

| | | | |
|---|---|---|---|
| 2,561,303 | 7/1951 | Whittle | 114/67 R |
| 2,742,247 | 4/1956 | Lachmann | 244/130 |
| 2,969,759 | 1/1961 | Giles | 114/20 R |
| 3,016,865 | 1/1962 | Eichenberger | 114/20 R X |
| 3,066,893 | 12/1962 | Mercier | 244/73 R |
| 3,194,201 | 7/1965 | Lang | 114/20 R |
| 3,286,674 | 11/1966 | Thompson et al. | 114/20 R X |
| 3,382,831 | 5/1968 | Madison | 114/20 R |
| 3,392,693 | 7/1968 | Hulsebos et al. | 114/20 R |
| 3,435,796 | 4/1969 | Merrill | 114/20 R X |
| 4,186,679 | 2/1980 | Fabula et al. | 114/20 R |

Primary Examiner—David H. Brown
Attorney, Agent, or Firm—Robert F. Beers; Ervin F. Johnston; Thomas Glenn Keough

[57] ABSTRACT

A low drag underwater vehicle utilizing boundary layer suction is provided wherein the vehicle includes a hull having nose, mid and tail sections. A permeable shell is mounted in a spaced relationship about the hull so that ambient water can be drawn into the space therebetween. The space between the permeable shell and the hull is divided into nose, mid and tail compartments. A pump is provided. Separate passageways are provided for connecting the nose and tail compartments to the pump and for connecting the mid compartment to the pump. The pump is capable of pumping the nose and tail compartments at a greater rate per unit area of permeable shell than the mid compartment. With this arrangement boundary layer suction through the permeable shell is greater at the nose and tail portions of the underwater vehicle than at the mid portion where the tendency toward turbulence is not as severe.

16 Claims, 9 Drawing Figures

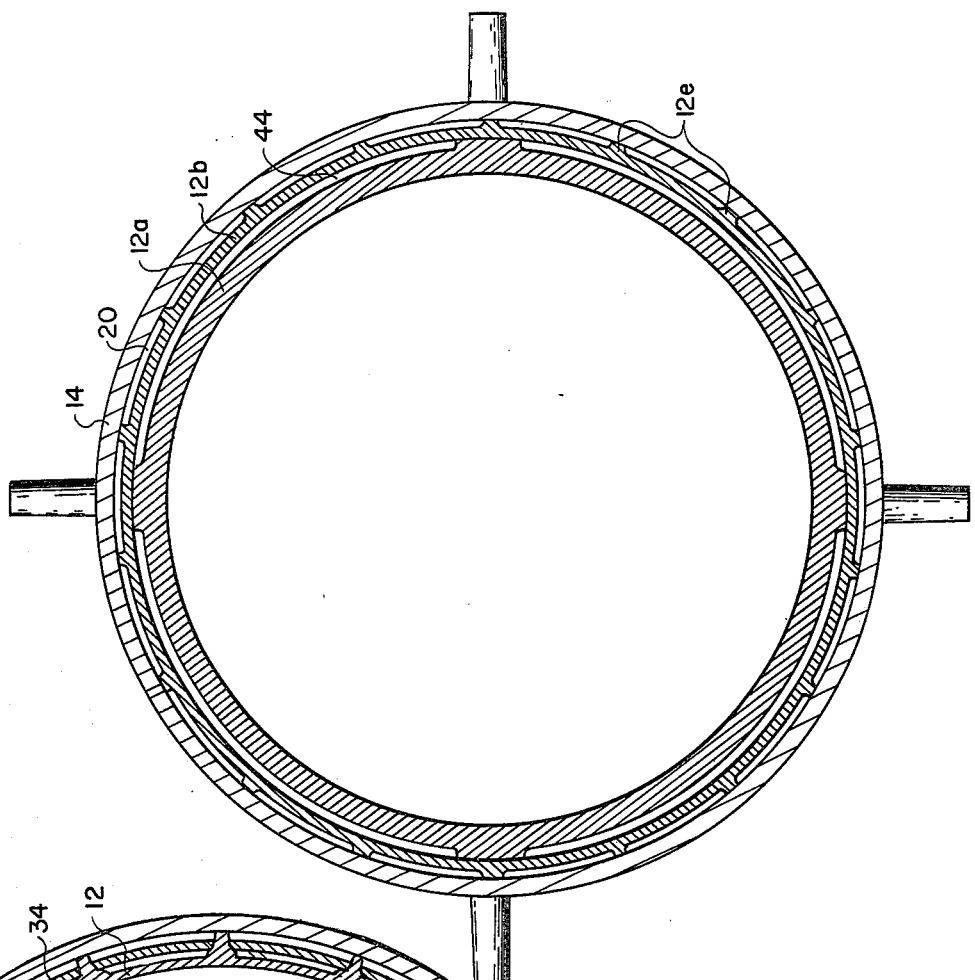
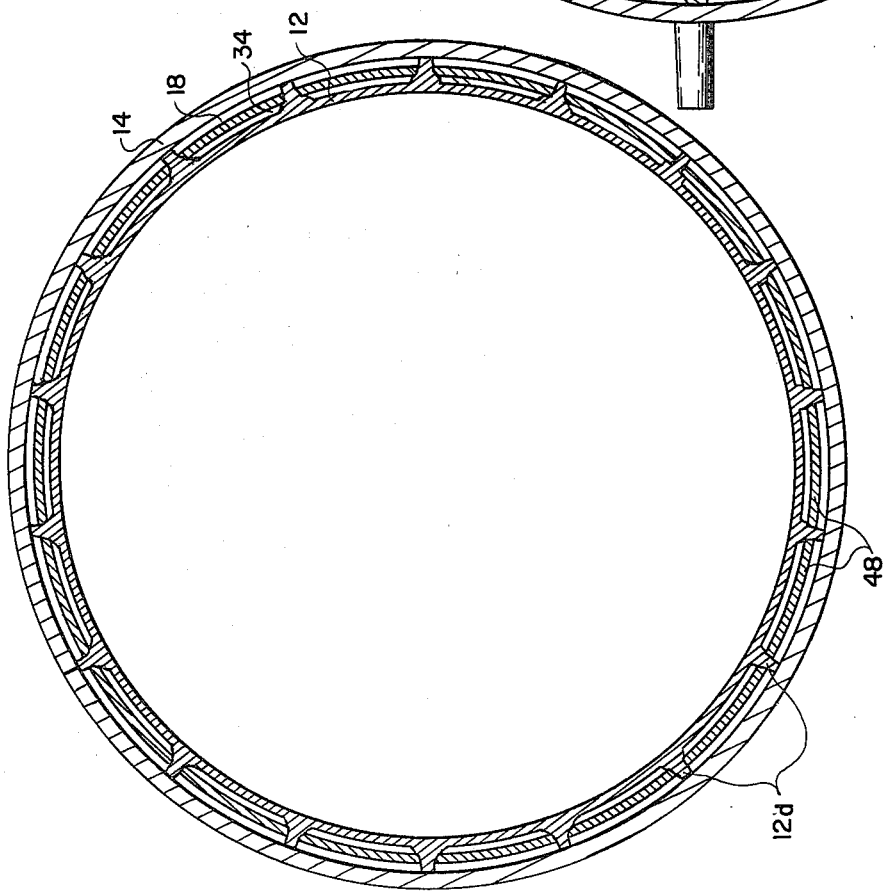

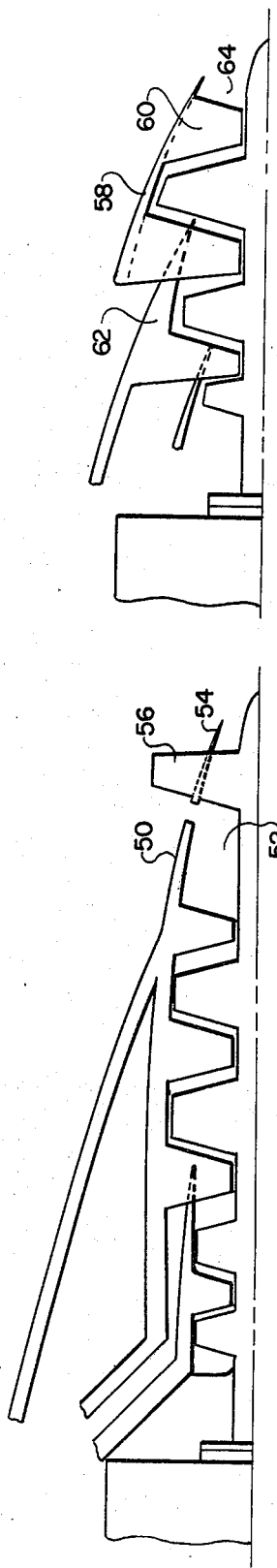
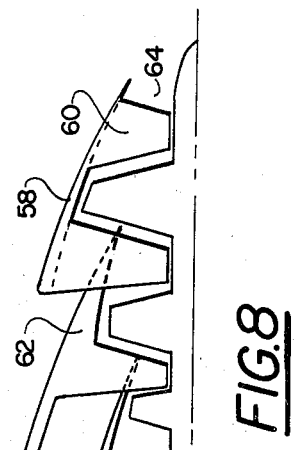
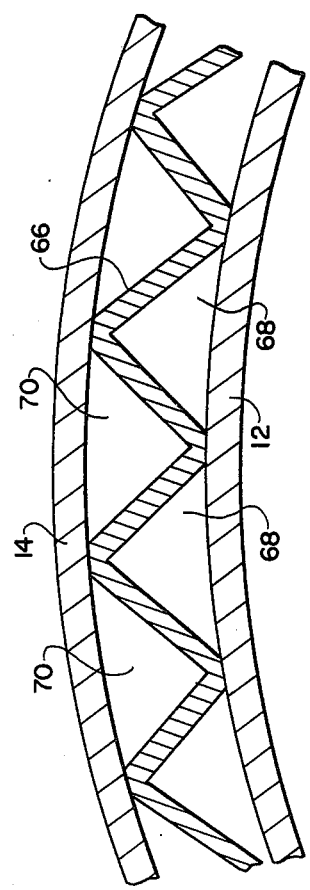
FIG. 8
FIG. 7
FIG. 9

LOW DRAG UNDERWATER VEHICLE UTILIZING BOUNDARY LAYER SUCTION

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

One of the primary impediments to high speed from an underwater vehicle is turbulent flow of the ambient water immediately adjacent to the exterior surface of the vehicle. The U.S. Navy has experimented with many methods of maintaining a laminar flow so as to enable high speeds of these vehicles, particularly torpedoes. One such method which has involved considerable experimentation has been boundary layer control by suction (BLCS). Even though the possibility of maintaining laminar flow over smooth surfaces by suction was first proposed by Prandtl in 1904, it was not until the late '50's that the Navy gave serious consideration to applying this technique to torpedo design. In 1962, the Naval Ordnance Test Station maintained full length laminar flow over a porous shell wind tunnel model at Reynolds numbers up to $12 \times 10^6$ and angles of attack up to 4 degrees. In 1963, Northrup achieved a laminar flow over a slotted shell wind tunnel model at Reynolds numbers up to $60 \times 10^6$, and the following year achieved laminar flow over a slotted shell water tunnel model at Reynolds numbers up to $20 \times 10^6$.

Previous application of boundary layer control suction to porous-shelled torpedoes included simply a single suction compartment between the hull of the vehicle and the outer porous shell. This approach is not efficient for the typical torpedo shape with a blunt nose since the turbulent flow is much less of a problem at the mid section of the torpedo as compared to the nose and tail sections thereof. Consequently, the prior art approach, which is acceptable for an ellipsoidal-like shape, would result in a waste of power for a cigar-like shape if suction was applied equally along the full length of the torpedo.

SUMMARY OF THE INVENTION

The present invention has overcome the inefficiency involved in the application of boundary layer control suction to Navy torpedoes by sucking in water at the nose and tail sections of the torpedo at a rate which is greater than the suction of water at the mid section thereof. In the invention, a permeable shell is mounted in a spaced relationship about the hull of the torpedo so that ambient water can be drawn into the space therebetween. The space between the permeable shell and the hull is divided into nose, mid and tail compartments. A pump is provided, and a first passageway communicatively connects the nose and tail compartments to one part of the pump while a second passageway communicatively connects the mid compartment to another part of the pump. The pump is configured so that it is capable of pumping the nose and tail compartments at a greater rate per unit area of permeable shell than the mid compartment. With this arrangement boundary layer suction through the permeable shell is greater at the nose and tail portions of the underwater vehicle than at the mid portion thereof.

OBJECTS OF THE INVENTION

An object of the present invention is to overcome the aforementioned problem associated with the application of boundary layer control suction to underwater vehicles.

Another object is to optimize the boundary layer control suction technique to torpedoes.

Still another object is to reduce the suction power requirements in the application of boundary layer control suction to a torpedo, and improve the propulsive efficiency of the thrust producing mechanism.

These and other objects of the invention will become more readily apparent from the ensuing specification when taken together with the drawings.

DESCRIPTION OF THE DRAWINGS

FIG. 5 is a sectional taken along plane V—V of FIG. 1.

FIG. 6 is a sectional taken along plane VI—VI of FIG. 1.

FIG. 7 is a schematic top portion of a modified tail portion of the torpedo.

FIG. 8 is a schematic top portion of still another modified tail portion of the torpedo.

FIG. 9 is a cross sectional view of a modified mid section portion of the torpedo for communicating the nose and tail compartments thereof.

DESCRIPTION OF THE PREFERRED EMBODIMENTS

Figure 1:
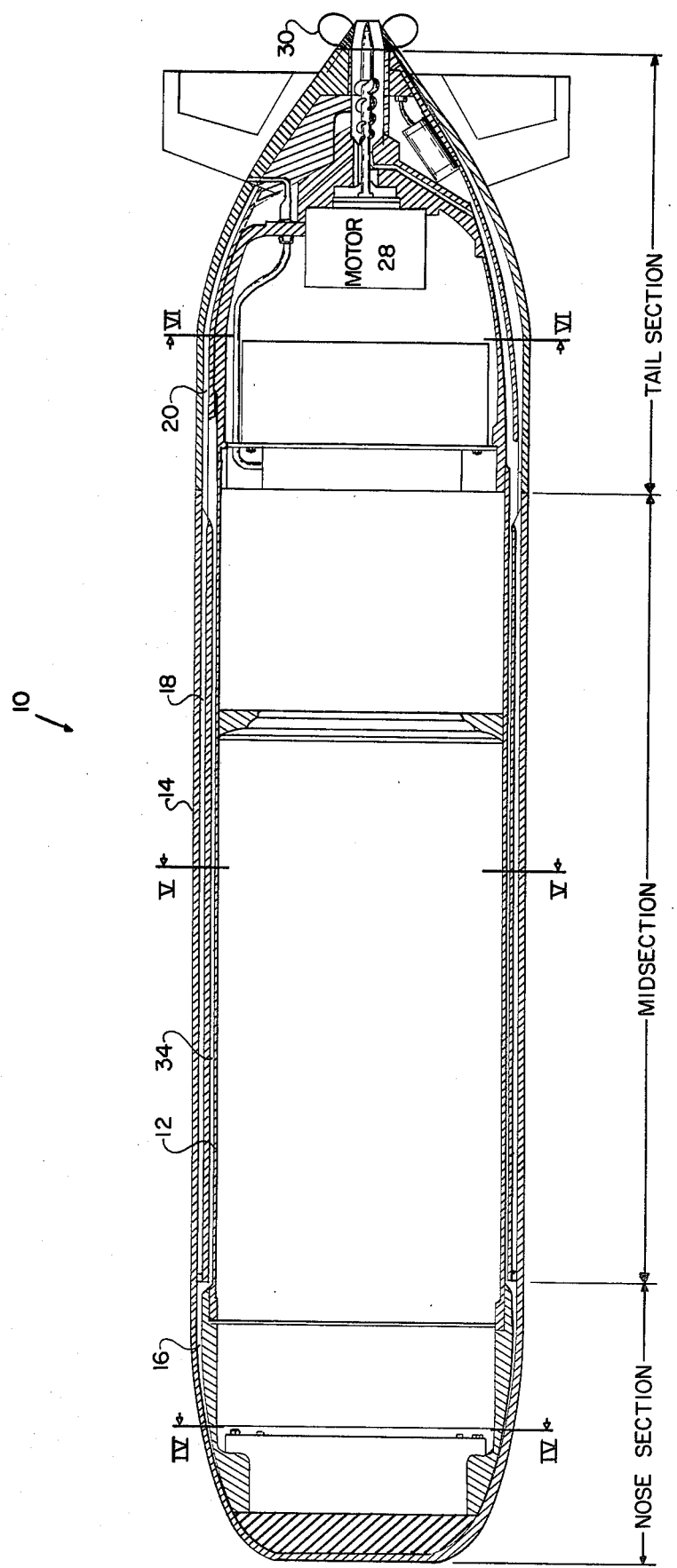
FIG. 1 is a longitudinal cross-sectional view of a torpedo utilizing the boundary layer control suction technique of the present invention.

Referring now to the drawings wherein like reference numerals designate like or similar parts throughout the several views there is illustrated in FIG. 1 a torpedo 10 which utilizes boundary layer control suction in a unique manner according to the present invention. The torpedo includes a hull 12 which has nose, mid and tail sections. As can be seen in FIG. 1, the nose of the torpedo is blunt, the mid section is cylindrical, and the tail section is generally ogive. Accordingly, the tendency toward turbulence at the nose and tail sections is considerably more of a problem than along the cylindrical mid section thereof. The present invention concentrates its major suction forces on the nose and tail sections as contrasted to the mid section so as to conserve power and make the torpedo more efficient.

A permeable shell 14 is mounted in a spaced relationship about the hull 12 so that ambient water can be drawn into the space therebetween. The permeable shell 14 is spaced about one quarter of an inch from the hull 12 and is preferably porous with a pore size below 25 microns so that any particle caught in a pore will be too small to project far enough into the boundary layer to trigger turbulence. The space between the permeable shell 14 and the hull 12 is divided into a nose compartment 16, a mid compartment 18, and a tail compartment 20.

Figure 3:
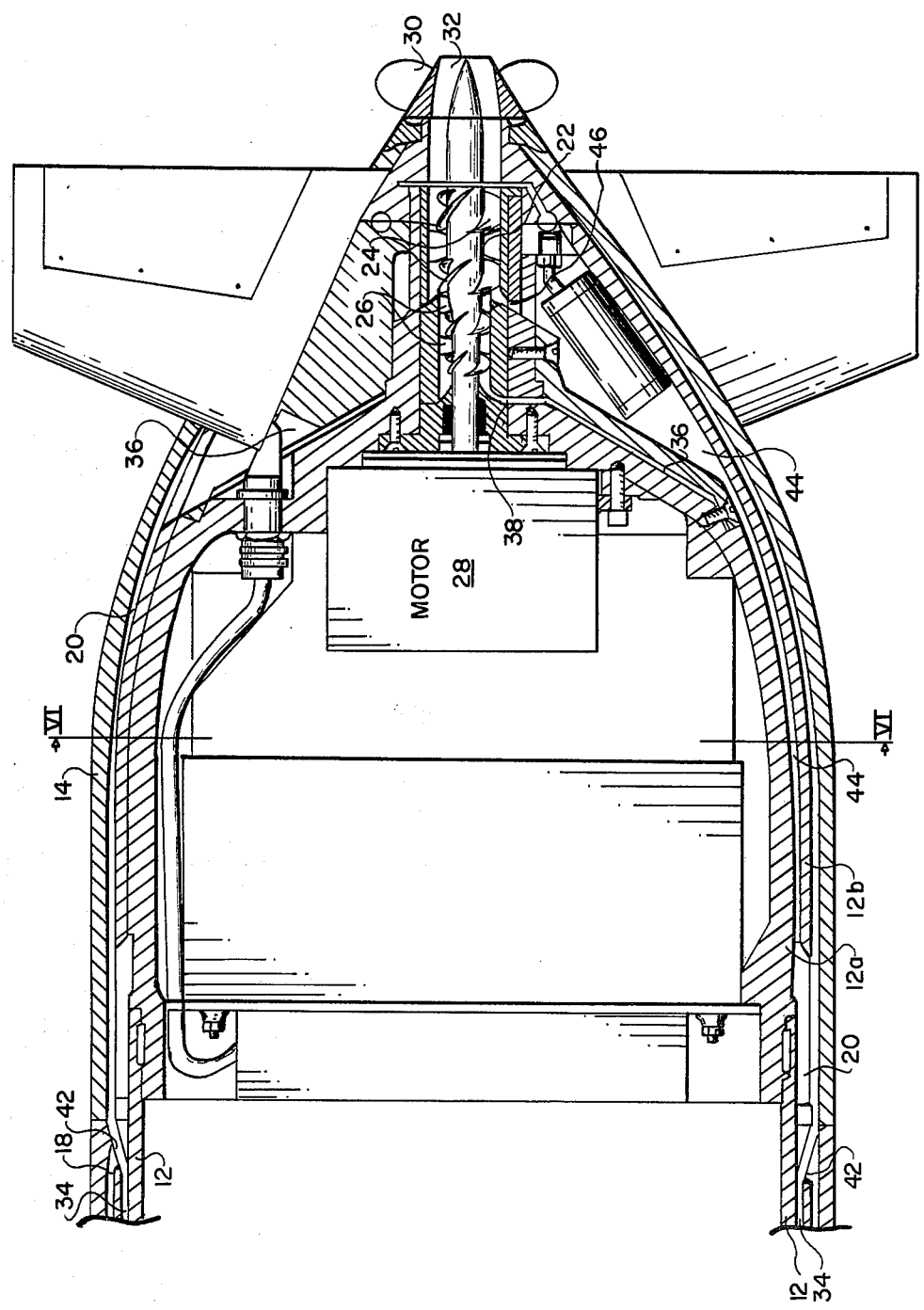
FIG. 3 is an enlarged tail portion of the torpedo of FIG. 1.

As illustrated in FIG. 3, a multistage pump is provided in the tail section of the torpedo. The pump includes a shaft 22 which has rotors 24 mounted thereon. Between the rotors are stators 26. The shaft 22 may be turned by an electric motor 28, and may extend a short distance beyond the rearmost hull portion of the torpedo for the mounting of a propeller 30. As will be appreciated more fully hereinafter, efficiency is achieved by combining the propeller 30 and the rotors 24 on the same shaft 22. The hub of the propeller 30 and the rearmost hull portion of the torpedo form an annular nozzle 32 about the shaft 22 for a purpose which will also become apparent hereinafter.

Figure 2:
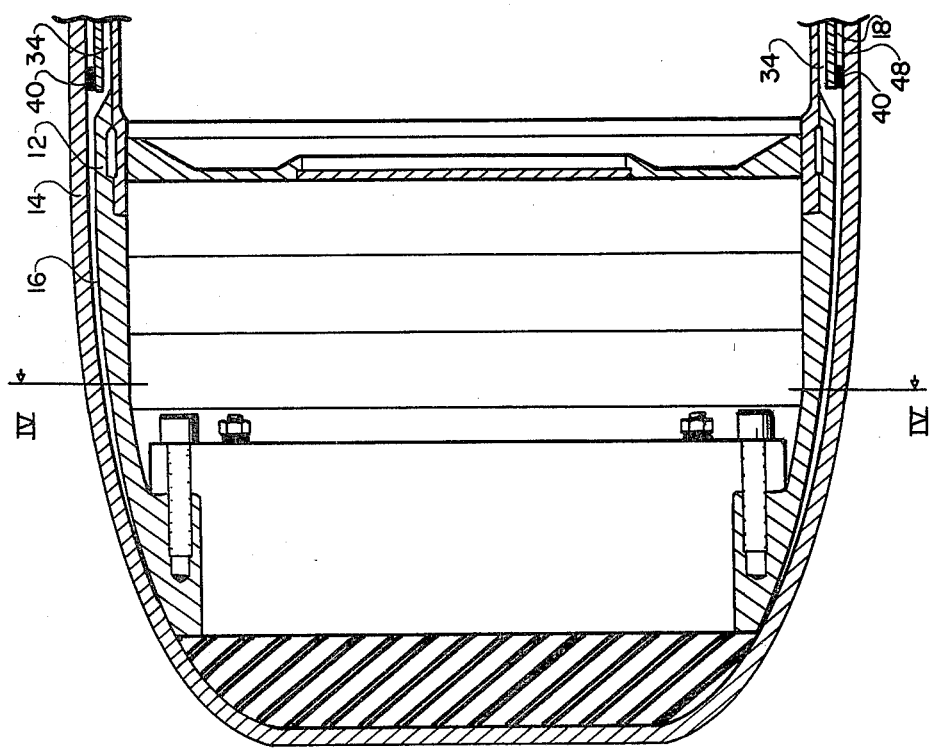
FIG. 2 is an enlarged nose portion of the torpedo of FIG. 1.

Means are provided for communicatively connecting the nose compartment 16 and the tail compartment 20 to an upstream stage or rotor 24 of the pump, and a separate means is provided for communicatively connecting the mid compartment 18 to a downstream stage or rotor 24 of the pump. The means for communicatively connecting the nose and tail compartments to the pump may include an annular duct 34 generally in the mid section of the torpedo for communicatively connecting the nose compartment 16 to the tail compartment 20 and a passageway 36 for communicatively connecting the tail compartment 20 to an upstream stage of the pump via passageway 38. As illustrated in FIG. 2, an annular plate 40 in the foremost part of the mid compartment 18 may direct flow from the nose compartment 16 into the first duct 34, and as illustrated in FIG. 3, a plurality of tubes 42 sealed to the aft portion of the annular duct 34 and to the forward portion of the tail compartment 20 may be utilized for merging the nose compartment water with the tail compartment water. As illustrated in FIG. 3, the means for communicatively connecting the mid compartment 18 to the pump may include a chamber 44 which is directed to an after stage of the pump by a passageway 46. By directing water from the nose and tail compartments to an upstream stage of the pump and directing the mid compartment to a downstream stage of the pump the pump will suck water into the nose and tail compartments 16 and 20 at a greater rate per unit area of permeable shell 14 than the water sucked in at the mid compartment 18. This is a very important feature of the present invention since the majority of the suction occurs at the exterior surface of the torpedo where turbulence is more of a problem than at the mid portion thereof. The most desirable situation is that the pressure and velocity of the nose and tail compartment water leaving the upstream stage of the pump where the passageway 46 is located be substantially the same as the pressure and velocity of the mid compartment water entering the downstream stage of the pump at the passageway 46.

Figure 4:
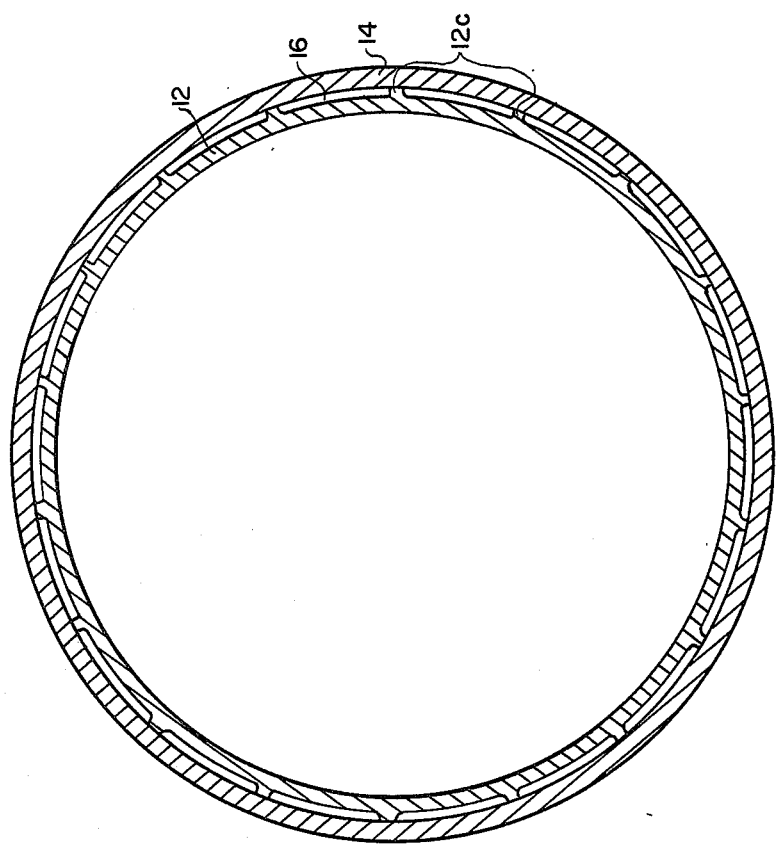
FIG. 4 is a section taken along plane IV—IV of FIG. 1.

As illustrated in FIG. 3, the hull 12 may be split into inner hull and outer hull portions 12a and 12b. The inner and outer hull portions may then form the chamber 44 for communicating mid compartment water to an after stage of the pump. FIGS. 4, 5 and 6 illustrate details of the nose, mid and tail compartments of the torpedo. Since the porous shell 14 will have limited structural strength, the hull 12 is provided with longitudinal projections 12c, 12d and 12e as seen in FIGS. 4, 5 and 6 respectively for supporting the permeable shell in the nose, mid and tail sections of the torpedo. As illustrated in FIG. 5, curved plates 48 may extend between the longitudinal projections 12d for forming the walls for the outer mid compartment 18 and the inner duct 34.

In a preferred embodiment the permeable shell 14 has a variable permeability between the nose and tail of the torpedo. Since the turbulence is more of a problem at the nose and tail sections, the permeability of the shell 14 can be greater in these areas. The most desirable arrangement is to increase the permeability of the shell 14 toward both the nose and tail of the torpedo. This can be accomplished by increasing the porosity of the shell or by increasing the shell thickness.

Various modifications of the torpedo are illustrated in FIGS. 7, 8 and 9. In FIG. 7 the hull 50 forms at its terminal end a discharge nozzle 52. An annular shroud 54 is mounted on the propeller 56 coextensive with the nozzle 52 for separating the discharged compartment water from the ambient water. In FIG. 8 a shroud ring 58 is mounted on a rearmost stator 60 and extends at a fore end laterally beyond the hull 62 so as to bring in ambient water at substantially the same pressure and velocity as the local pump water, and forming at its rear end, a nozzle 64 for discharging both the energized ambient and compartment water. In FIG. 9, a modification is illustrated for the mid section of the torpedo in lieu of the longitudinal projections 12d and the plates 48 of FIG. 5. The modification is a corrugated plate 66 extending annularly between the hull 12 and the porous shell 14 and longitudinally sealed at its apexes to the inside of the permeable shell 14 and to the outside of the hull 12. With this arrangement a set of longitudinal passageways 68 with bases on the hull 12 are formed for communicating nose compartment water with tail compartment water, and longitudinal passageways 70 with bases on the permeable shell 14 are formed for communicating mid compartment water to the pump.

Obviously, many modifications and variations of the present invention are possible in the light of the above teachings, and, it is therefore understood that, within the scope of the disclosed inventive concept, the invention may be practiced otherwise than as specifically described.

I claim:

1. A low drag underwater vehicle utilizing boundary layer suction comprising:
    a hull having nose, mid and tail sections;
    a permeable shell mounted in a spaced relationship about the hull so that ambient water can be drawn into the space therebetween;
    the space between the permeable shell and hull being divided into nose, mid, and tail compartments;
    pump means;
    means communicatively connecting the nose and tail compartments to the pump means;
    means communicatively connecting the mid compartment to the pump means; and
    said pump means being capable of pumping the nose and tail compartments at a greater rate per unit area of permeable shell than the mid compartment,
    whereby boundary layer suction through the permeable shell is greater at the nose and tail portions of the underwater vehicle than at the mid portion thereof.

2. An underwater vehicle as claimed in claim 1 including:
    the permeability of the permeable shell increasing toward the nose and tail sections of the vehicle hull.

3. An underwater vehicle as claimed in claim 1 including:
    the mid section of the hull being substantially cylindrical; and
    the nose of the vehicle being blunt.

4. An underwater vehicle as claimed to claim 1 including:
the pump means having multiple stages; and
the connecting means communicatively connecting the nose and tail compartments to an upstream stage and communicatively connecting the mid compartment to a downstream stage.

5. An underwater vehicle as claimed in claim 1 wherein the communicatively connecting means for the nose and tail compartments includes:
first duct means communicatively connecting the nose compartment to the tail compartment and second duct means communicatively connecting the tail compartment to the pump means.

6. An underwater vehicle as claimed in claim 5 including:
the mid section of the hull being substantially cylindrical; and
nose of the vehicle being blunt.

7. An underwater vehicle as claimed in claim 6 including:
the pump means having multiple stages; and
the connecting means communicatively connecting the nose and tail compartments to an upstream stage and communicatively connecting the mid compartment to a downstream stage.

8. An underwater vehicle as claimed in claim 7 including:
the permeability of the permeable shell increasing toward the nose and tail sections of the vehicle hull.

9. A low drag underwater vehicle utilizing boundary layer suction comprising:
a hull having a blunt nose section, a substantially cylindrical mid section, and a tail section;
a permeable shell mounted in a spaced relationship about the hull so that ambient water can be drawn into the space therebetween, the permeability of the permeable shell increasing toward the nose and tail sections of the hull;
the space between the permeable shell and hull being divided into nose, mid, and tail compartments;
pump means having upstream and downstream stages;
first duct means communicatively connecting the nose compartment to the tail compartment, and second duct means communicatively connecting the tail compartment to the upstream stage of the pump means;
means communicatively connecting the mid compartment to the downstream stage of the pump means; and
said pump means being capable of pumping the nose and tail compartments at a greater rate per unit area of permeable shell than the mid compartment with the water from the upstream stage of the pump being substantially at the same pressure and velocity as that of the mid compartment water entering the downstream stage of the pump;
whereby boundary layer suction through the permeable shell is greater at the nose and tail portions of the underwater vehicle than at the mid portion thereof.

10. An underwater vehicle as claimed in claim 9 wherein the first duct means includes:
corrugated means longitudinally sealed at its apexes to the inside of the permeable shell and to the outside of the hull to form a set of longitudinal passageways with bases on the hull for communicating nose compartment water with tail compartment water, and longitudinal passageways with bases on the permeable shell for communicating mid compartment water.

11. An underwater vehicle as claimed in claim 10 including:
the multistaged pump having a plurality of rotors mounted on a shaft;
a stator between each rotor; and
a shroud ring mounted on a rearmost stator and extending at a fore end laterally beyond the hull so as to bring in ambient water at substantially the same pressure and velocity as the compartment water, and forming at its rear end a nozzle for discharging both ambient and compartment water.

12. An underwater vehicle as claimed in claim 10 wherein:
the hull forms a nozzle at the aft end of the pump for discharging water from the compartments.

13. A low drag underwater vehicle utilizing boundary layer suction comprising:
a hull having a blunt nose section, a substantially cylindrical mid section, and a tail section;
a permeable shell mounted in a spaced relationship about the hull so that ambient water can be drawn into the space therebetween, the permeability of the permeable shell increasing toward the nose and tail sections of the hull;
the space between the permeable shell and hull being divided into nose, mid, and tail compartments;
pump means having upstream and downstream stages;
the hull forming a nozzle at the aft end of the pump for discharging water from the compartments;
first duct means communicatively connecting the nose compartment to the tail compartment, and second duct means communicatively connecting the tail compartment to the upstream stage of the pump means;
means communicatively connecting the mid compartment to the downstream stage of the pump means;
the first duct means and the communicatively connecting means for the mid compartment including corrugated means longitudinally sealed at its apexes to the inside of the permeable shell and to the outside of the hull to form a set of longitudinal passageways with bases on the hull for communicating nose compartment water with tail compartment water, and longitudinal passageways with bases on the permeable shell for communicating mid compartment water;
said pump means being capable of pumping the nose and tail compartments at a greater rate per unit area of permeable shell than the mid compartment with the water from the upstream stage of the pump being substantially at the same pressure and velocity as that of the mid compartment water entering the downstream stage of the pump and with the water discharged from the compartments through the nozzle being substantially the same velocity and pressure as the passing ambient water,
whereby boundary layer suction through the permeable shell is greater at the nose and tail portions of the underwater vehicle than at the mid portion thereof.

14. An underwater vehicle as claimed in claim 13 wherein:
- the multistaged pump includes a plurality of rotors mounted on a shaft;
- said shaft extends aft of the hull; and
- a propeller is mounted on the shaft aft of the hull.

15. An underwater vehicle as claimed in claim 14 wherein:
- an annular shroud is mounted on the propeller coextensive with the nozzle for separating the discharged compartment water from the ambient water.

16. A low drag underwater vehicle utilizing boundary layer suction comprising:
- a hull having nose, mid and tail sections;
- a permeable shell mounted in a spaced relationship about the hull so that ambient water can be drawn into the space therebetween;
- the space between the permeable shell and hull being divided into nose, mid, and tail compartments;
- pump means having upstream and downstream stages;
- means communicatively connecting the nose and tail compartments to the upstream stage of the pump means;
- means communicatively connecting the mid compartment to the downstream stage of the pump means; and
- said pump means being capable of pumping the nose and tail compartments at a greater rate per unit area of permeable shell than the mid compartment with the water from the upstream stage of the pump being substantially at the same pressure and velocity as that of the mid compartment water entering the downstream stage of the pump,
- whereby boundary layer suction through the permeable shell is greater at the nose and tail portions of the underwater vehicle than at the mid portion thereof.

* * * * *